United States Patent
Kaplan et al.

(10) Patent No.: US 7,272,271 B2
(45) Date of Patent: Sep. 18, 2007

(54) ELECTRO-OPTICAL INTEGRATED TRANSMITTER CHIP FOR ARBITRARY QUADRATURE MODULATION OF OPTICAL SIGNALS

(75) Inventors: Arkady Kaplan, Rockville, MD (US); Yaakov Achiam, Rockville, MD (US); Arthur Greenblatt, Silver Spring, MD (US); Isaac Shpantzer, Bethesda, MD (US); Pak Shing Cho, Gaithersburg, MD (US); Michael Tseytlin, Bethesda, MD (US); Aviv Salamon, Washington, DC (US)

(73) Assignee: Celight, Inc., Silver Spring, MD (US)

( * ) Notice: Subject to any disclaimer, the term of this patent is extended or adjusted under 35 U.S.C. 154(b) by 784 days.

(21) Appl. No.: 10/613,772

(22) Filed: Jul. 2, 2003

(65) Prior Publication Data

US 2004/0028418 A1 Feb. 12, 2004

Related U.S. Application Data

(63) Continuation-in-part of application No. 10/084,057, filed on Feb. 28, 2002, which is a continuation-in-part of application No. 09/962,339, filed on Sep. 26, 2001, now Pat. No. 7,110,677, which is a continuation-in-part of application No. 09/962,243, filed on Sep. 26, 2001, now Pat. No. 7,167,651.

(60) Provisional application No. 60/392,938, filed on Jul. 2, 2002.

(51) Int. Cl.
*G02F 1/035* (2006.01)
*G02B 6/26* (2006.01)
*G02B 6/42* (2006.01)

(52) U.S. Cl. .................. 385/3; 385/39; 359/246; 359/254

(58) Field of Classification Search .................. 385/3, 385/39
See application file for complete search history.

(56) References Cited

U.S. PATENT DOCUMENTS 5,060,312 A * 10/1991 Delavaux ................ 398/204
5,101,450 A * 3/1992 Olshansky ................ 385/3

(Continued)

FOREIGN PATENT DOCUMENTS

GB 2289812 10/1994

OTHER PUBLICATIONS

G. Nicholson, "Optical Source linewidth criteria for heterodyne communication systems with PSK modulation", Optical and Quantum Electronics, vol. 17, pp. 399-410, 1985.

(Continued)

*Primary Examiner*—Michelle Connelly-Cushwa
*Assistant Examiner*—Rhonda S. Peace

(57) ABSTRACT

An optical device includes, a first Mach-Zehnder modulator that produces a first output, and a second Mach-Zehnder modulator which produces a second output. A splitter couples the first and second Mach-Zehnder modulators. A combiner combines the first and second outputs. A phase shifter is coupled to the first and second Mach-Zehnder modulators. The first Mach-Zehnder modulator, second Mach-Zehnder modulator, splitter, combiner and the phase shifter are each formed as part of a single chip made of electro-optical material. Such two similar optical device integrated together with polarization combiner provide a two-polarization performance.

69 Claims, 12 Drawing Sheets

U.S. PATENT DOCUMENTS

| | | | | |
|---|---|---|---|---|
| 5,161,206 | A | 11/1992 | Djupsjobacka | 385/2 |
| 5,222,103 | A | 6/1993 | Gross | 378/54 |
| 5,301,058 | A * | 4/1994 | Olshansky | 398/194 |
| 5,416,859 | A | 5/1995 | Burns et al. | 385/3 |
| 5,644,665 | A * | 7/1997 | Burns et al. | 385/3 |
| 5,654,818 | A * | 8/1997 | Yao | 359/246 |
| 5,867,295 | A * | 2/1999 | Betts | 398/194 |
| 6,469,649 | B1 * | 10/2002 | Helkey et al. | 341/155 |
| 6,476,952 | B1 | 11/2002 | Snawerdt | 359/173 |
| 6,607,313 | B1 * | 8/2003 | Farries et al. | 398/102 |
| 7,065,302 | B1 * | 6/2006 | Jelks | 398/196 |
| 2001/0007601 | A1 * | 7/2001 | Kondo et al. | 385/2 |
| 2003/0007216 | A1 | 1/2003 | Chraplyvy et al. | 359/161 |
| 2003/0043437 | A1 | 3/2003 | Stough et al. | 359/173 |
| 2003/0090768 | A1 | 5/2003 | Liu et al. | 359/183 |
| 2003/0206676 | A1 * | 11/2003 | Ovadia et al. | 385/11 |

OTHER PUBLICATIONS

R.A. Griffin, et al., "10 Gb/s optical differential quadtrature phase shift key (DQPSK) transmission using GaAs/AlGaAs integration", Proceedings OFC-2002, Mar. 2002, Anaheim, CA, post-deadline paper.

G. Kazovsky, et al, "ASK and FSK coherent lightwave systems: a simplified approximate analysis", IEEE Journal of Lightwave Technology, vol. 8, No. 3, pp. 338-353, 1990.

S. Shimotsu, et al., "Single Side-Band Modulation Performance of LiNbO3 Integrated Modulator Consisting of Four-Phase Modulator Waveguides", IEEE Photon. Tech. Letters, vol. 13, No. 4, pp. 365-366, 2001.

* cited by examiner (a)

(b)

(a)

(b)

ELECTRO-OPTICAL INTEGRATED TRANSMITTER CHIP FOR ARBITRARY QUADRATURE MODULATION OF OPTICAL SIGNALS

CROSS-REFERENCE TO RELATED APPLICATIONS

The present invention claims the benefit of U.S. Ser. No. 60/392,938, filed Jul. 2, 2002 and is also a continuation-in part of U.S. Ser. No. 09/962,243, filed Sep. 26, 2001, now U.S. Pat. No. 7,167,651, U.S. Ser. No. 09/962,339, filed Sep. 26, 2001, now U.S. Pat. No. 7,110,677, and U.S. Ser. No. 10/084,057, filed February 28, 2002, all of which applications are fully incorporated herein by reference.

BACKGROUND OF THE INVENTION

1. Field of the Invention

This invention relates generally to electro-optical modulation devices and their methods and use, and more particularly to electro-optical modulation devices formed on a single chip, and their methods of use.

2. Description of the Related Art

Lasers are widely used today in fiber and free space segments for high data rate communication links, remote sensing applications (LIDAR) and more. In these applications the light signal is modulated, usually using electro-optical modulators.

In optical communications the modulation scheme commonly used is On-Off Keying (OOK), see FIG. 2a, where only the power of the light is modulated. Alternative modulation schemes include Phase Shift Keying (PSK), where the data is encoded in the phase of the signal. In RF communications more advanced modulation schemes are used, such as QPSK (quadrature phase shift keying) and QAM (quadrature amplitude modulation) see FIG. 2b. By using such communication schemes, for example, in optical communication systems, the capacity and link performance can be greatly enhanced in comparison with the direct detection schemes. In LIDAR, which is the extension of radar to the optical domain, the required pulse shaping can be achieved, such as chirped pulses, Barker coding, etc.

For these applications and others, the light should be modulated both in amplitude and phase, essentially with a complex modulation signal. The present invention is an integrated electro-optical modulator capable of modulating a light signal with an arbitrary complex signal.

The previous experiments in this field were based on un-integrated solutions (viz. separate electro-optical components connected by fibers). This practice reduces performance and increases cost.

Such modulating formats as PSK (for example, BPSK and QPSK) were used mostly in the coherent communication systems (see, for example, T. G. Hodgkinson, "Demodulation of Optical DPSK using in-phase and quadrature detection", *Electronics Letters,* Vol. 21, No19, pp. 867–868, 1985). The majority of the work in this field was made by implementing non-integrated solutions, i.e. various optical components such as amplitude and phase modulators connected by optical fibers. Such communication schemes were abandoned in the late 1980's and are still not implemented due to their complexity and high cost.

Some examples of monolithic integration of optical modulators have different implementations and/or are still far from being implemented in practical optical systems (see, for example, S. Shimotsu at. al. "Single Side-Band Modulation Performance of a LiNbO$_3$ Integrated Modulator Consisting of Four-Phase Modulator Waveguides", *IEEE Photon. Tech. Letters,* Vol. 13, No. 4, pp. 364–366, 2001 or R. A. Griffin, R. I. Johnstone, R. G. Walker, J. Hall, S. D. Wadsworth, K. Berry, A. C. Carter, M. J. Wate, J. Hughes, P. A. Jerram, and N. J. Parsons, "10 Gb/s optical differential quadrature phase shift key (DQPSK) transmission using GaAs/AlGaAs integration", Proceedings OFC-2002, March 2002, Anaheim, Calif., post-deadline paper).

Optical devices including X-cut LiNbO$_3$ have been described in, for example, U.S. published application no. 2001/0007601, filed Jul. 12, 2001, and U.S. Pat. No. 5,416,859, issued May, 16, 1995. The U.S. Pat. No. 5,526,448, filed Jun. 11, 1996 discloses the optical waveguide modulator with a reduced DC drift. The foregoing published application and patent are incorporated by reference to the extent necessary to understand the present invention.

Optical devices currently available are based on non-integrated and/or semi-integrated solutions, i.e. optical fibers or optical fiber-based components were used for connecting of various electro-optical components and/or splitting/combining the optical signals. There are no completely planar integrated solutions for the device that is capable to provide an arbitrary modulating format (phase and/or amplitude modulation)..

Accordingly, there is a need for integrated monolithic devices that provide modulation of the input signal in phase and/or amplitude domain. There is a further need for integrated monolithic devices that provide quadrature phase shift keying (BPSK and/or QPSK) or quadrature amplitude modulation (QAM) by use of a single, monolithically integrated device. There is a yet a further need for improved devices that is re-applicable for BPSK and/or QPSK communication systems, controlled chirp or Barker coding for LADAR as well as other remote sensing applications.

SUMMARY OF THE INVENTION

Accordingly, an object of the present invention is to provide an optical device, its methods of use, that modulates an input signal in phase and/or amplitude domain.

Another object of the present invention is to provide integrated single monolithic devices, and their methods of use, for arbitrary generation of optical signals by changing phase and/or amplitude.

Yet another object of the present invention is to provide integrated, single monolithic devices for optical data communication applications.

A further object of the present invention is to provide integrated, single monolithic devices for LADAR applications.

Another object of the present invention is to provide integrated, single monolithic devices for remote sensing applications.

A further object of the present invention is to provide integrated, single monolithic devices for quadrature phase shift keying (BPSK and/or QPSK).

Yet another object of the present invention is to provide integrated, single monolithic devices for quadrature amplitude modulation (QAM) applications Still a further object of the present invention is to provide integrated, single monolithic devices for controlled chirp or Barker coding applications for LADAR as well as other remote sensing applications.

These and other objects of the present invention are achieved in an optical device with a first Mach-Zehnder modulator that produces a first output, and a second Mach- Zehnder modulator that produces a second output. A splitter is coupled to the first and second Mach-Zehnder modulators. A combiner combines the first and second outputs. A phase shifter is coupled to the first and second Mach-Zehnder modulators. The first Mach-Zehnder modulator, the second Mach-Zehnder modulator, the splitter, the combiner and the phase shifter are formed as part of a single planar chip made of electro-optical material.

In another embodiment of the present invention, an optical device includes a first Mach-Zehnder modulator producing a first output, a second Mach-Zehnder modulator producing a second output, a third Mach-Zehnder modulator producing a third output and a fourth Mach-Zehnder modulator producing a fourth output. A first input splitter is coupled to the first and second Mach-Zehnder modulators. A first phase shifter is coupled to the first and second outputs. A first output combiner is positioned to combine the first and second outputs from the first and second Mach-Zehnder modulators. A second input splitter is coupled to the third and fourth Mach-Zehnder modulators. A second phase shifter is coupled to the third and fourth outputs. A second output combiner is positioned to combine the third and fourth outputs.

In another embodiment of the present invention, a method is provided for producing an optical output. An optical device is provided with first and second Mach-Zehnder modulators formed as part of a single planar chip made of electro-optical material. A first output is produced from the first Mach-Zehnder modulator. A second output is produced from the second Mach-Zehnder modulator. The first and second outputs are combined to produce a combined output.

In another embodiment of the present invention, a method is provided for producing a dual polarization transmission. A device is provided that includes a first optical device with first and second Mach-Zehnder modulators, and a second optical device with third and fourth Mach-Zehnder modulators. The first and second optical devices are formed as part of a single planar chip made of an electro-optical material. A first output with a first polarization is produced from the first optical device. A second output with a second polarization is produced from the second optical device. The first and second outputs are combined to produce a beam with two orthogonal polarization signals.

DETAILED DESCRIPTION OF THE PREFERRED EMBODIMENTS

In one embodiment of the present invention, an optical device is provided that includes, a first Mach-Zehnder modulator that produces a first output, and a second Mach-Zehnder modulator which produces a second output. The first and second Mach-Zehnder modulators are coupled to an input splitter. A combiner combines the first and second outputs from first and second Mach-Zehnder modulators. A phase shifter is coupled to the first and second Mach-Zehnder modulators. The first Mach-Zehnder modulator, second Mach-Zehnder modulator, input splitter, combiner and the phase shifter are each formed as part of a single chip made of electro-optical material.

In various embodiments, the optical device of the present invention is an integrated optical device that is formed on a single chip, single piece of crystal including but not limited to a monolithic piece of a crystal wafer, that can be made of an electrooptical crystal including but not limited to $LiNbO_3$. In one embodiment, different cuts of the $LiNbO_3$ crystal are utilized including but not limited to X, Y, or Z. The present invention can utilize but not limited to Metal In-Diffusion and/or (Annealed) Protonic-Exchange technology, Wet Etching, Reactive Ion (Beam) etching, Plasma etching, and others.

Integration of all components in a single chip, such as a $LiNbO_3$ chip, reduces the cost, improves performance, and providing better stability and control. The optical device of the present invention integrated on a single chip can be used for any combination of quadrature (phase/amplitude) modulation such as quadrature amplitude modulation (QAM). The optical device of the present invention is formed as integrated on a single chip, the process steps utilized are partly disclosed in R. C. Alferness in "Ti Diffused LiNbO3 waveguide devices", in "Guided Wave Opto-electronics", Ed. T. Tamir, Springer-Verlag, 1988;

Wei-Lin Chen, et al. "Lithium Niobate ridge waveguides by nickel diffusion and proton-exchange and wet etching", IEEE Photonics Technology letters Vol.7 No. 11, 1995, both incorporated herein by reference.

In one embodiment of the present invention, the optical output of the optical device consists of an input signal that is modulated in phase/amplitude, such as by way of illustration quadrature phase shift keying (QPSK) or quadrature amplitude modulation (QAM) for communications, or controlled chirp or Barker coding for LADAR applications.

Figure 1:
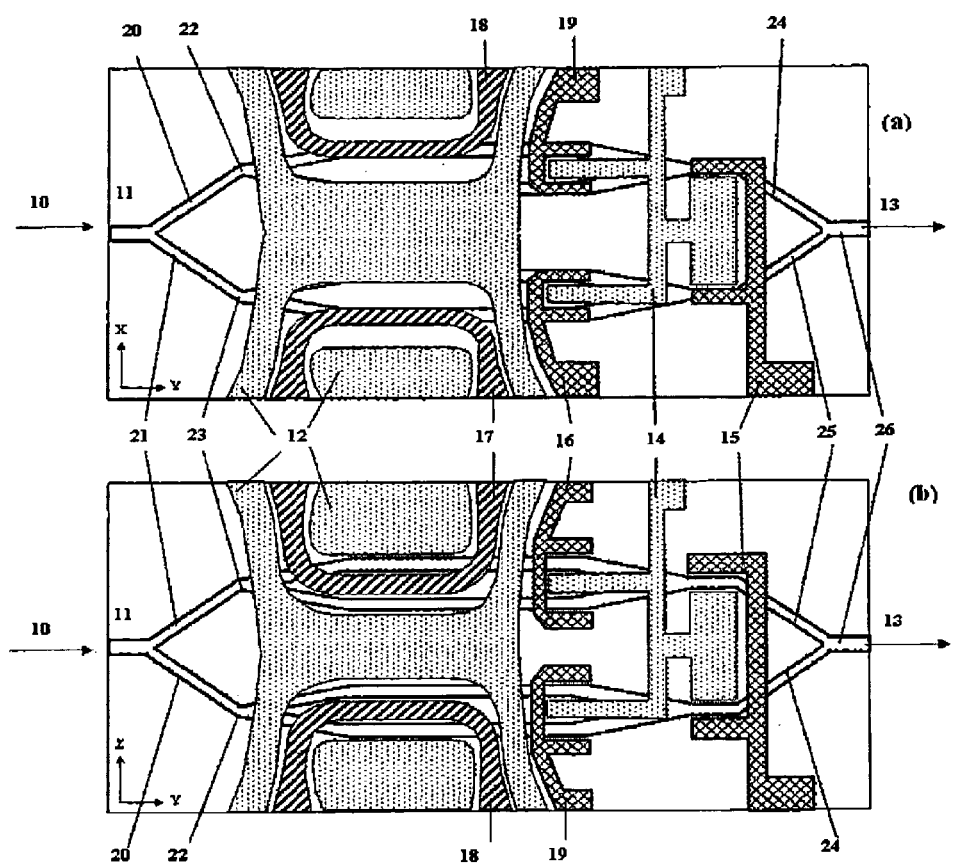
FIG. 1 The preferred design of the quadrature modulator on X cut (a) and Z cut (b) of $LiNbO_3$.
Figure 2:
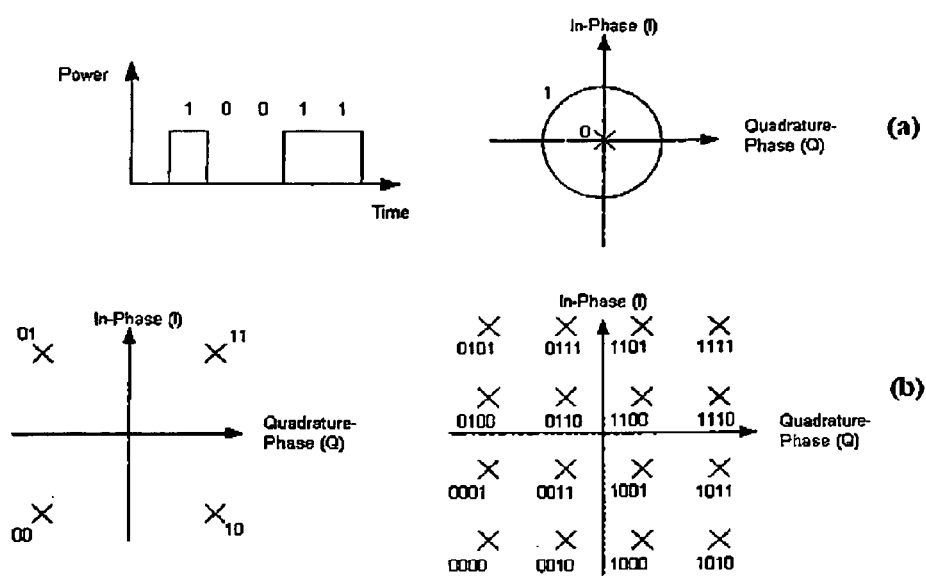
FIG. 2 Modulation format explanation: (a) On-Off Keying format, (b) Phase shift keying (PSK) and Quadrature amplitude (QAM) modulation formats.

The preferred design of the transmitter chip is shown in FIG. 1. As an example the two possible embodiments are shown on: X and Z cut of the LiNbO₃ crystal, see, FIG. 1a and FIG. 1b, respectively.

The light 10 impinges the device through the input 11, and split into two branches (In-phase and Quadrature-phase) 20, 21. The light in each branch is directed into its own Mach-Zehnder interferometer (MZI) at 22 and 23. The data is introduced into the light beam by the phase shift in the MZI. This phase shift is controlled by two RF signals applied to 18 and 19. The ground electrodes are marked as 12. Bias voltage 16 and 19 control the operating point of the MZIs. The voltage applied to the electrode 15 introduces a phase shift of 90° between the MZI outputs 24 and 25 to create a quadrature modulation. Ground electrode is marked as 14. The modulated light 13 comes out through output 26.

Figure 3:
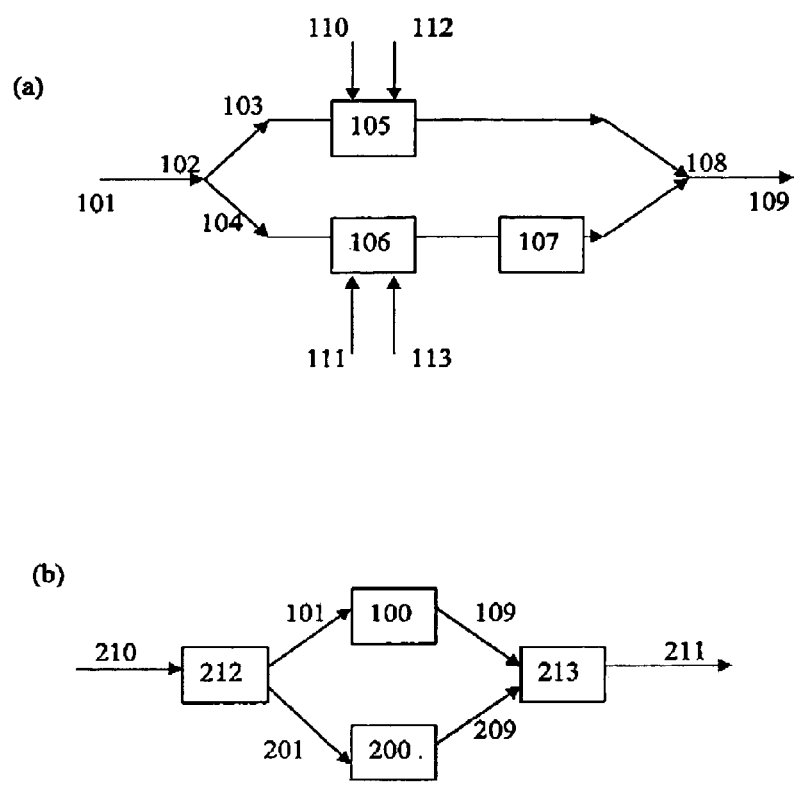
FIG. 3(a) A block diagram of the quadrature modulator, (b) A block diagram of the quadrature modulator operating in two (orthogonal) polarization states of light.

A block diagram of one embodiment of the optical device of the present invention, hereafter the "quadrature modulator" 100 is shown in FIG. 3(a). A passive Y-junction 102 divides the light coming from input 101 into two preferably equal beams 103 and 104. These beams 103 and 104 are directed to two Mach-Zehnder electro-optical modulators 105 and 106 driven by data RF signals, 110 and 111 respectively. Bias voltage 112 and 113 are applied to each Mach-Zehnder modulator to set the DC bias point. An additional phase shifter 107 obtains 90° phase difference between the two Mach-Zehnder modulators. Branches 114 and 115 are combined together using a Y-junction 108. The light comes out of the output 109 modulated by the quadrature data.

A general scheme for modulation on two (orthogonal) polarization states is shown in FIG. 3(b). The light coming from input 210 is divided into two branches 101 and 201 by outermost splitter or outermost polarization-splitter 212 (in the case of polarization splitter the incoming laser can be polarized at 45 deg). The light propagating in waveguides 100 and 200 is in accordance with direction of electro-optical operation of the modulator(s). The quadrature modulation of the polarized light is described in the previous paragraph. In this configuration (the two-polarization scheme), the light with each orthogonal polarization state is quadrature modulated by its own quadrature modulator 221 and 222, respectively (shown in FIG. 3(b)). The light coming from outputs 109 and 209 is combined together by outermost polarization combiner 213. Resulting output signal 211 consists two quadrature-modulated signals, each of different (orthogonal) polarization.

The quadrature modulator calibration could be carried out first at the manufacturing facility, then during the system setup, and then continuously during the operation.

For optimal device operation the following calibrations may be done (preferably in this order):

Bias the MZM's at extinction point (zero output power)
Equalization of the light contribution from 114, 115; 214, 215 in the overall output 211.
Maintain a 90° phase difference between the light coming from 114 and 115; 214 and 215
Alignment of the delay of the different paths HI, HQ, VI, and VQ, where H and V correspond to two orthogonal polarization states, horizontal and vertical, and I and Q correspond to in-phase (I) and quadrature phase (Q) modulation.

Figure 4:
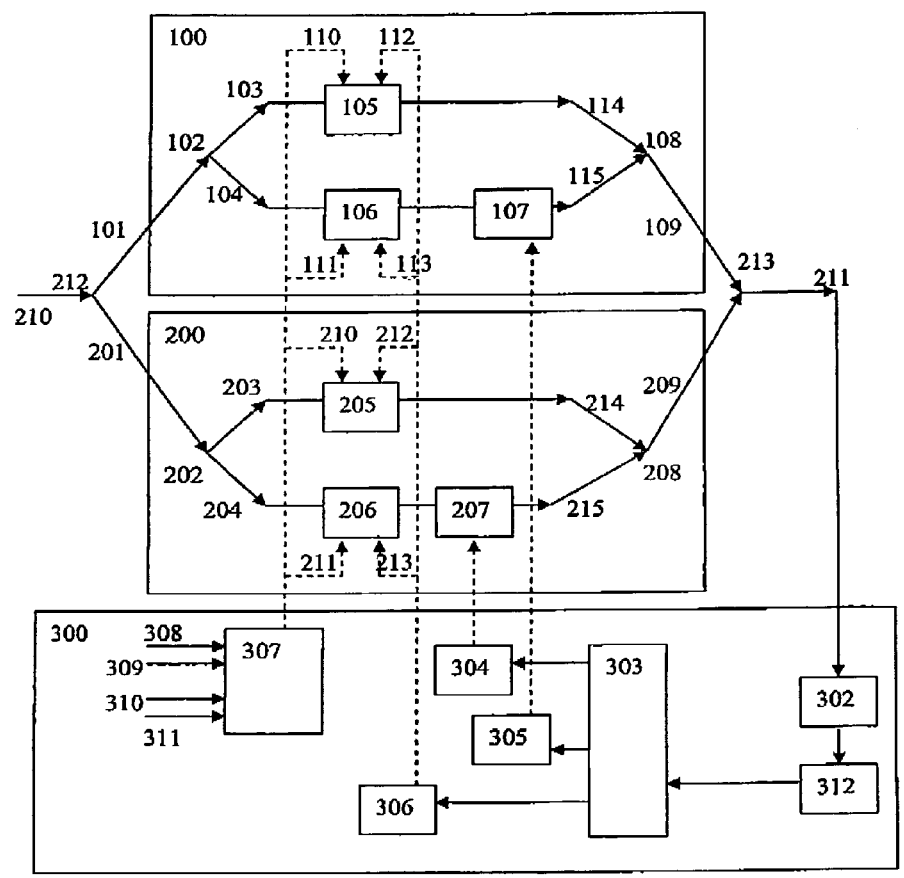
FIG. 4 is a block diagram illustrating a calibration scheme of the FIG. 1(a) device.

In one embodiment, the calibration is done by tapping the power of the branch marked as 211. The block diagram of the quadrature modulator calibration scheme is shown in FIG. 4. The calibration block is marked as 300. The tapped signal from branch 211 is detected by a photodiode 302 followed by an A/D converter 312. After digitization the digital signal is directed into a processor 303. The processor controls the 90° phase shift through phase controller 304, which supplies the voltage to the phase shifters 107,207. The bias control for the four MZI's is carried out by the bias controller 305 which supplies the DC bias voltage to 105, 106,205,206. Gain controller 306 controls the amplitude (power) of the MZI driver 307 that receives RF signals 308,309,310,311.

Figure 5:
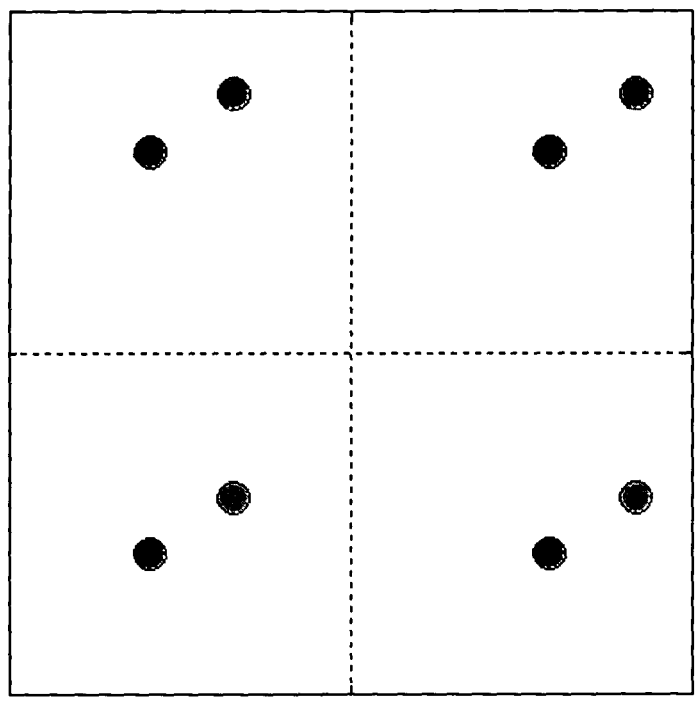
FIG. 5 shows the QPSK constellation without bias (in black) and with bias (in gray).
Figure 6:
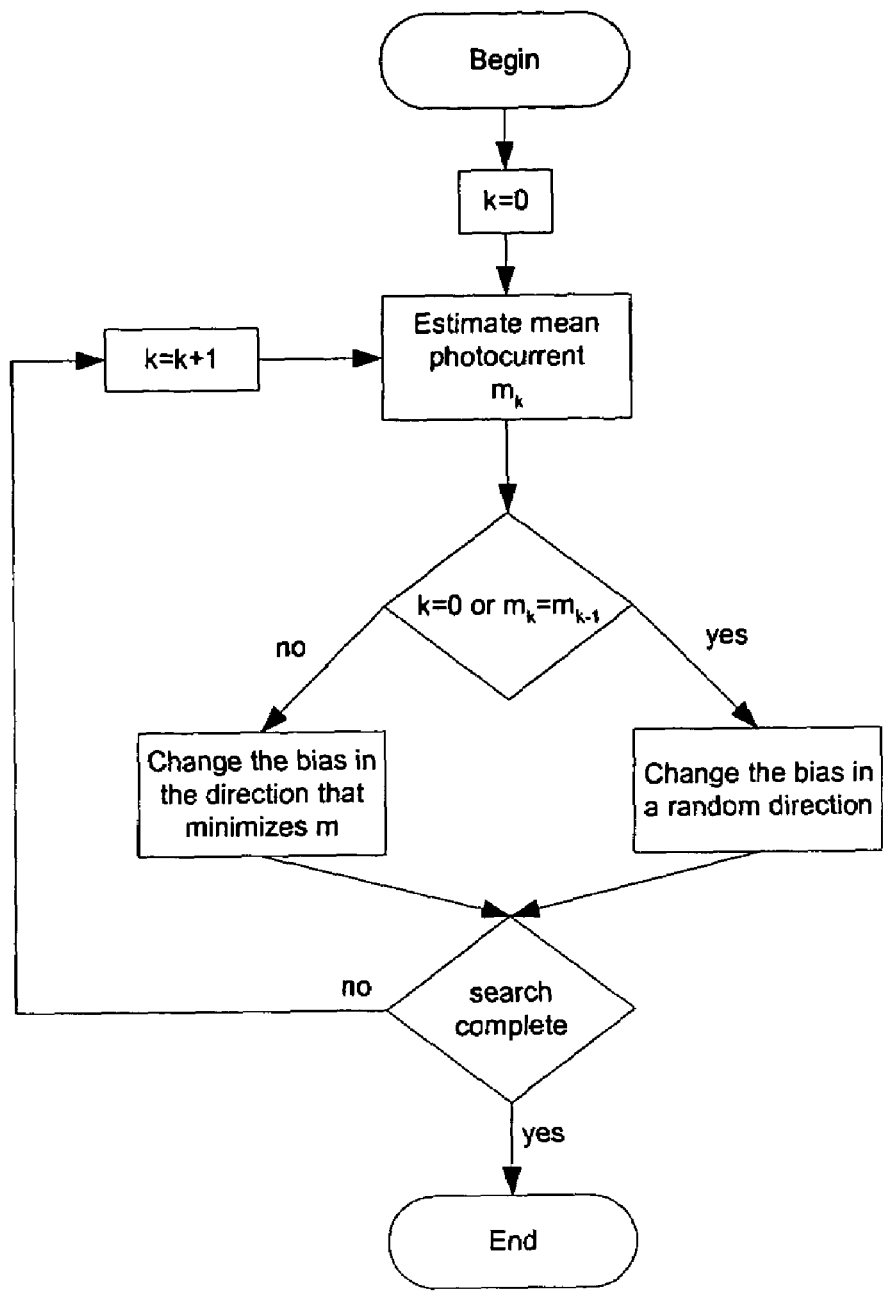
FIG. 6 is a flow chart of a search algorithm for bias control which can be used with the present invention..

The following algorithm can be used for the minimization of the bias in bias controller 305. Each of quadrature modulator 100 and 200 has two bias inputs (112 and 113 for 100; 212 and 213 for 200), the bias should put the MZI at extinction point (where the MZI output power is zero). FIG. 5 shows the QPSK constellation without bias (in black) and with bias (in gray), the average photocurrent (which is proportional to the power) is proportional to $$\frac{1}{4}\sum_{k=0}^{3}\left|B+e^{j\left(\frac{\pi}{4}+\frac{\pi}{2}k\right)}\right|=|B|^2+1,$$

so the bias is minimal when the mean current is minimal, given that all other parameters are constant. In one embodiment of the present invention, the bias is controlled by employing a search algorithm, such as shown in FIG. 6, that keeps changing the bias (112, 113, 212 and 213 separately) to make the average power minimal. The bias minimization may be done on payload (provided that all constellation points have equal probability) or on training sequences. In the second case, it is preferable for all channels to be at extinction point for calibration. Algorithm implementations are not limited to the mentioned below example, a variety of other algorithms can be used.

The goal of the power equalization calibration is that the four signals coming from channels 114, 115, 214, 215 have equal contributions (one quarter each) to the power of output signal 211. This can be done in two ways:

Set all MZMs on the extinction point so that their power output is zero, except for the one in the channel to be measured, thus measuring only its power and then adjust it accordingly. This can't be done during payload transmission, but only during initialization or training.

Figure 7:
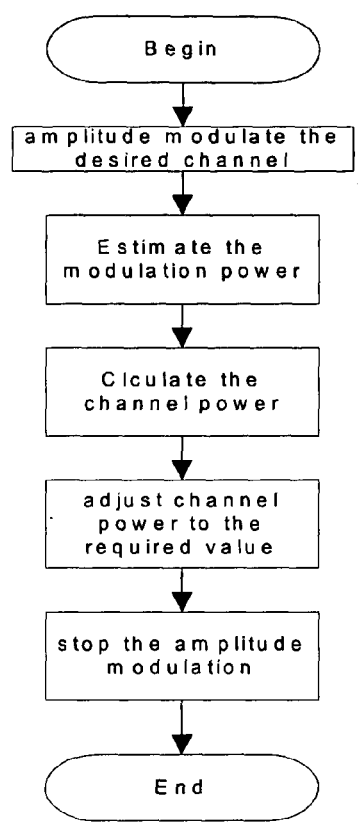
FIG. 7 is a flow chart of an algorithm that can be used for the power equalization using driver controller.

Amplitude modulate one of the channels at a time with low frequency and small index of modulation and detect the power at the modulation frequency. If the amplitude of the channel to be measured is A'=A(1+m sin(ω_m t)), with A as the nominal amplitude, m the index of modulation and ω_m the modulation angular frequency, then the photocurrent is proportional to $$P+A^2(1+m\sin(\omega_m t))^2 = P+A^2\left(1+2m\sin(\omega_m t)+m^2\frac{1-\cos(2\omega_m t)}{2}\right),$$

where P is the power of all other channels, and the power at the modulation frequency is proportional to $\Sigma i e^{-j\omega_m t} \propto A^2 m$. By measuring the modulation power (by changing the amplitude of the signal, not the modulation index) we can equalize the channel powers to a nominal required value. It is important here, to make sure that the modulation index used with each of the channels is the same. This method can be used during normal operation (payload), provided that the modulation index and frequency are low enough. FIG. 7 shows the algorithm used for the power equalization using driver controller 306. Applicable algorithms are not limited to the mentioned below example, a variety of other algorithms can be used.

Yet another method is to tap the power of outputs 114, 115, 214 and 215 and measure them with the same diode (using a switch) or different diodes with uniform parameters.

Figure 8:
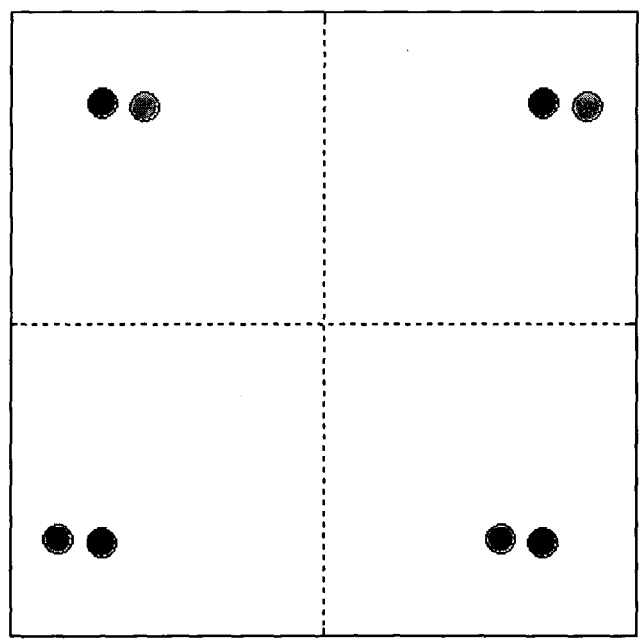
FIG. 8 illustrates QPSK constellation with 90 degrees phase difference and with a small phase offset.
Figure 9:
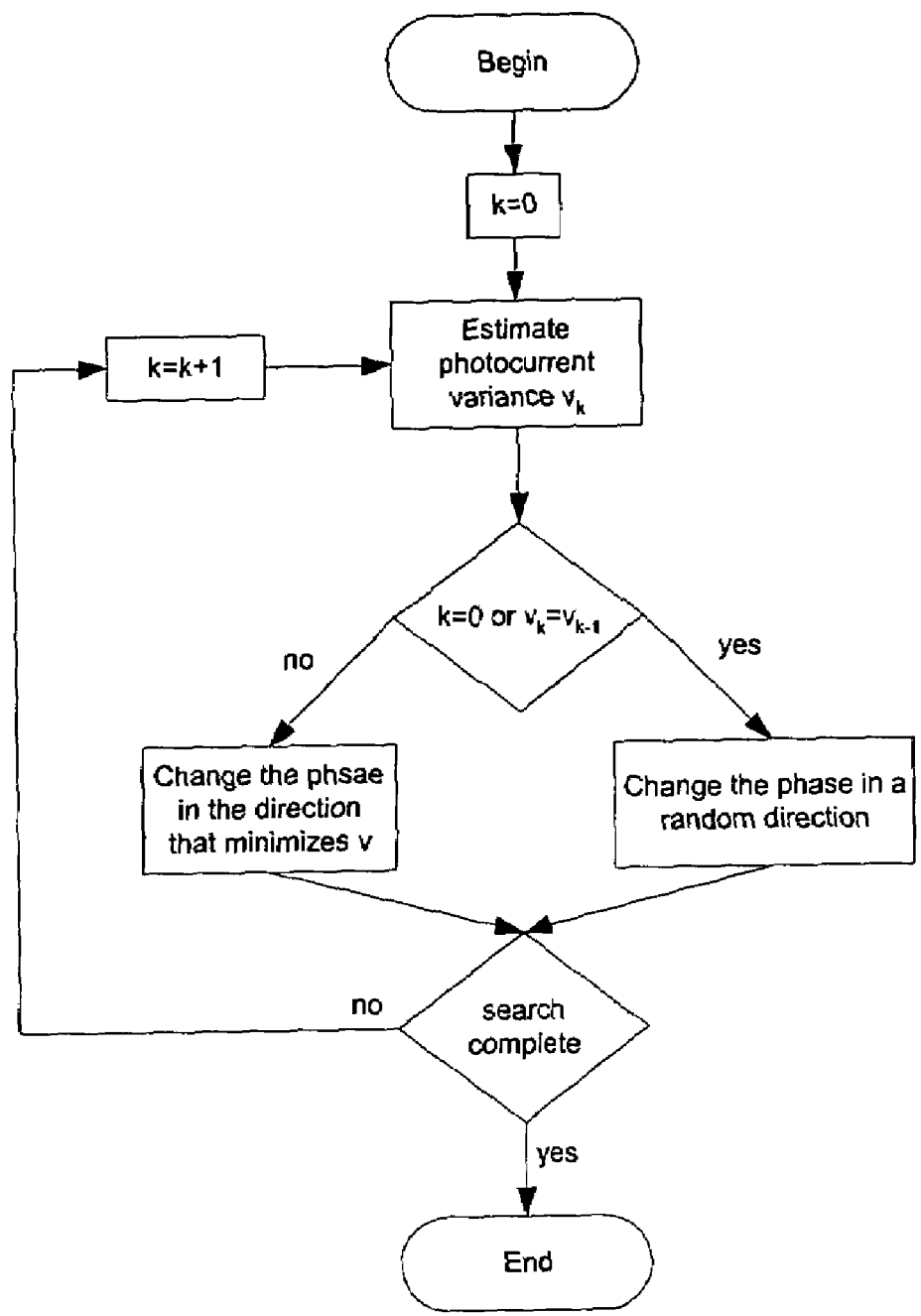
FIG. 9 is a flow chart of a search algorithm that can be used to keep changing the phase (while other parameters are kept constant) to make the power variance minimal.

The goal of the phase calibration is to keep a relative phase difference of 90 degrees between branches 114 and 115; and 214 and 215. FIG. 8 shows the QPSK constellation with 90 degrees phase difference (in blue) and with a small phase offset. The constellation points do not have the same power. Their power is proportional to $$\left|\cos\left(\frac{\pi}{4}+\frac{\pi}{2}k\right)+je^{j\psi}\sin\left(\frac{\pi}{4}+\frac{\pi}{2}k\right)\right|^2=1-(-1)^k\sin\psi, \text{ with } \frac{\pi}{4}+\frac{\pi}{2}k$$

the nominal transmitted phase and ψ the phase different offset between the I and Q channels. The variance of the photocurrent over the constellation points is proportional to $\sin^2\psi$, and is minimal when the channels are orthogonal (ψ=0). The phase is controlled by employing a search algorithm, like the one shown in FIG. 9 that keeps changing the phase (while other parameters are kept constant) to make the power variance minimal. This may be done on payload or during training.. Applicable algorithms are not limited to the mentioned below example, a variety of the other algorithms can be used.

It is required to time align the electrical signals 112 and 113, 212 and 213 of the Quadrature modulator, see FIG. 4. For an RZ input signal 210 these electrical signals have to be also be aligned with the incoming optical pulses train (such that changes in the applied electrical signals occur between the RZ pulses). In one embodiment, the time alignment works with both RZ and NRZ optical signals.

Precise alignment can be achieved by optical delay of the pulse train or electronic delay of the sinusoidal wave applied to the optical pulse generator. Optical delay is an expensive solution, however, due to optical coupling and limited range of delay. Electronic delay can be implemented with a mechanical-based microwave adjustable delay line that is an acceptable solution for laboratory use but not practical for commercial deployment. Furthermore, active closed-loop control of the timing alignment is required to minimize mistiming due to short and long term drift of the group delays of the on-board electronic components such as driver amplifiers, serializers/multiplexers, phase drift of VCO, etc. caused by the effect of environment such as temperature change.

Optimal time alignment can be achieved by maximizing the average optical power of the signal. The electrical signal that drives the data modulator has finite rise and fall times. This fact coupled with the typical fifty percent duty cycle of RZ pulse provides an adequate sensitivity for this technique using only the average optical power as a feedback signal. Only a low speed (kHz range) optical power detector for monitoring, a low speed analog-to-digital and digital-to-analog converters (ADC and DAC) and a microprocessor for signal processing are required. These are low cost commercial off-the-shelf components and no other special components are required. The specifications of these components do not depend on the data rate which makes the present technique scalable to high bit rates.

Figure 10:
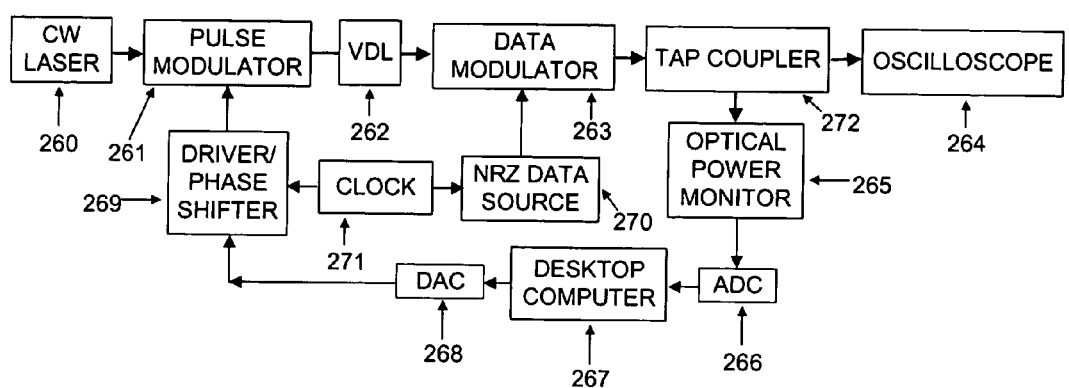
FIG. 10 illustrates an experimental setup for testing pulses and modulation time alignment of the FIG. 1(a) device.
Figure 11:
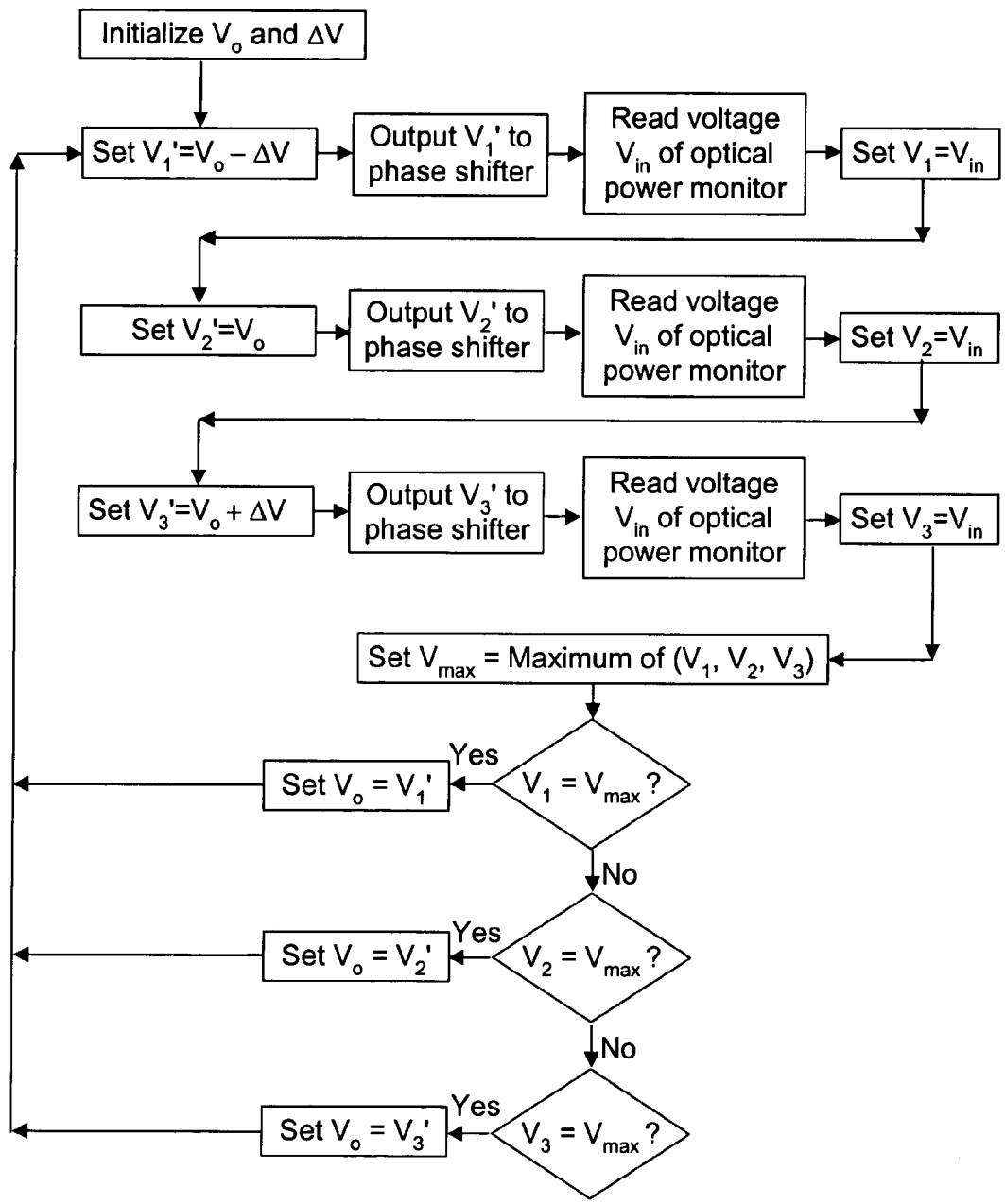
FIG. 11 is flow chart that illustrates an algorithm for optimizing the timing alignment by maximizing the optical power for one embodiment of the present invention.

Experiments were conducted to verify the signal and modulator alignment. FIG. 10 shows the test setup. At the transmitter, two Mach-Zehnder modulators (MZM) for the RZ pulse and data were used to generate a PSK signal or an OOK signal at 12.5 Gb/s. A CW laser 260 is launched to a LiNbO$_3$ MZM 261 driven by a 12.5 GHz sinusoidal wave from a clock source. The MZ modulator was biased at quadrature to produce a near 50% duty cycle pulse train. A clock driver amplifier with a built-in voltage-controlled phase shifter 269 from Multilink (MTC5531) was inserted between the 12.5 GHz clock source 271 and the RZ modulator 261. The phase shift versus voltage of the MTC5531 is close to linear with a slope of approximately 45°/N. This corresponds to approximately 10 ps/V for 12.5 GHz clock rate. The optical pulse was directed to a second push-pull MZM 263 driven by a 12.5 Gb/s electrical binary NRZ data pulse from a pattern generator 270, which was synchronized with the clock source 271. The data MZM can be biased at quadrature to produce an OOK signal or at null to produce a PSK signal. The output of the data MZM is directed to an oscilloscope 264 for monitoring. A portion of the output was tapped using a tap coupler 272 and sent to an optical power meter 265 with an analog voltage output proportional to the average optical power. The voltage output is connected to a 12-bit ADC (National Instrument) 266, which is connected to a desktop computer 267. The computer runs a program with an algorithm similar to the one shown in FIG. 11. The output of a 16-bit DAC (National Instrument) 268 from the computer is connected to the phase shifter voltage input of the Multilink clock driver 269.

Figure 12:
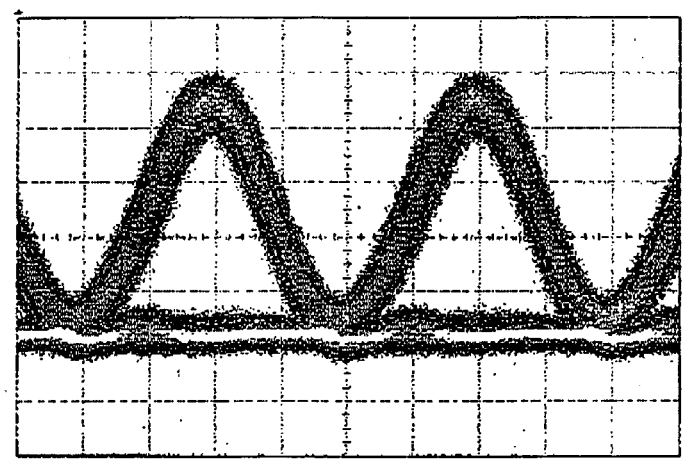
FIG. 12(a) is an eye diagram of a 12.5 Gb/s RZ-OOK signal with perfect synchronization of the pulse and data for the FIG. 1(a) device.
FIG. 12(b) is an eye-diagram of a 12.5 Gb/s RZ-OOK signal with worst case misalignment of half a bit-period delay for one embodiment of the present invention.
Figure 12:
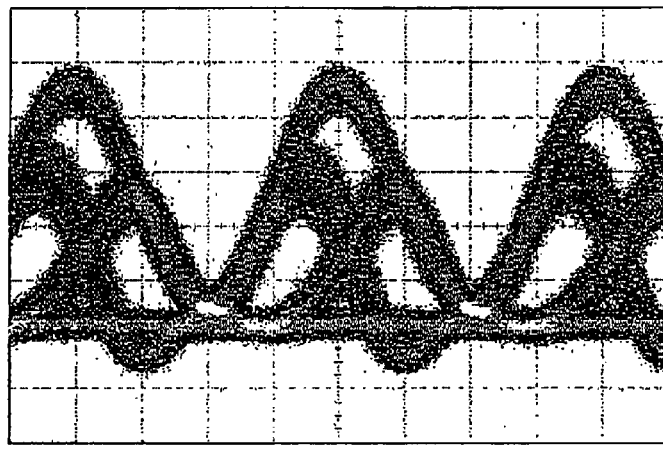
Figure 13:
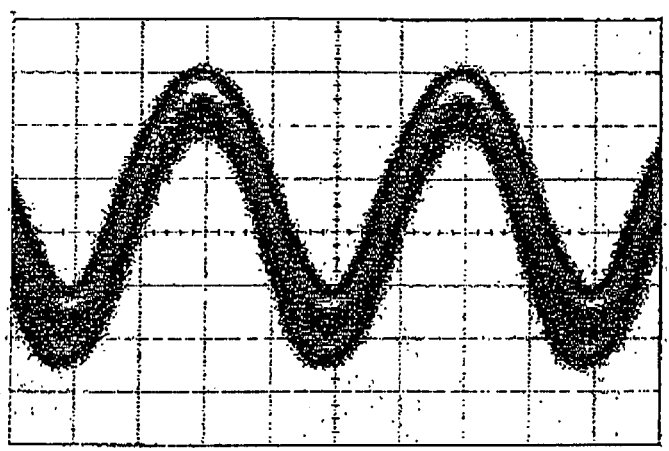
FIG. 13(a) is an eye diagram of a 12.5 Gb/s RZ-PSK signal with perfect synchronization of the pulse and data for one embodiment of the present invention
FIG. 13(b) is an eye diagram of a 12.5 Gb/s RZ-PSK signal with worst case timing misalignment of half a bit-period delay for one embodiment of the present invention.
Figure 13:
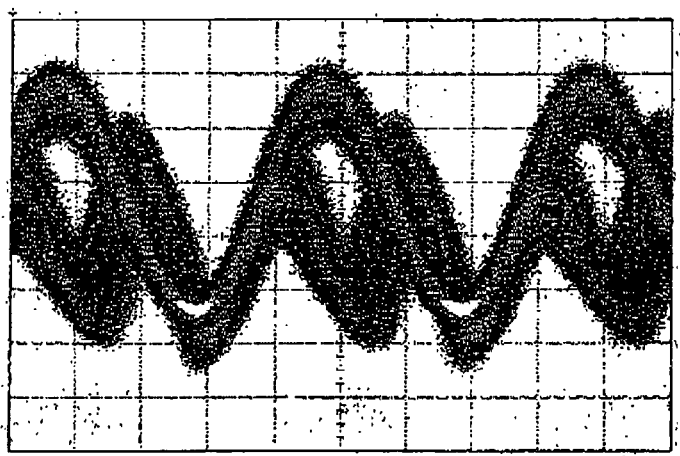

A variable optical delay line 262 was inserted between the pulse and data MZMs (261 and 263) to test the automatic synchronization setup by introducing arbitrary timing misalignment. FIGS. 12(a) and 13(a) show the eye diagrams of the 12.5 Gb/s RZ-OOK and RZ-PSK signals with the computer program activated and timing alignment optimized. With the computer control loop deactivated, the optical delay line was adjusted to produce the worst-case timing misalignment such that the transitions of the NRZ data signal were aligned to the peaks of the RZ pulses as shown in FIGS. 12(b) and 13(b) for RZ-OOK and RZ-PSK. Without the computer control loop, the bit-error-rate for both OOK and PSK signals are unacceptably high. With the computer control loop activated, the timing alignment are optimized and the eye diagrams of both signals resumed back to those as shown in FIGS. 12(a) and 13(a). Automatic timing alignment and control is therefore demonstrated in this test.

One calibration procedure for the time alignment is described below. The transmitted signal is described as:

$$s(t)=e^{j\omega t}(p(t)\cos \Phi + e^{j\theta}p(t-\tau)\sin \Phi)_s \qquad (1)$$

where Φ—phase of the transmitted symbol, τ—relative phase delay between I and Q electrical signals, θ—relative phase difference between optical I and Q components, p(t)—signal pulse shape. The phase Φ should alternate between two values:

$$\frac{\pi}{4}+\frac{\pi}{2}k \text{ and } \frac{\pi}{4}+\frac{\pi}{2}k+\pi,$$

where k is 0 or 1 and constant during the integration, so that p(t) is not constant.

For closed loop control the signal at the output of Quadrature modulator is tapped and detected by a low BW PIN diode optical detector.

$$r(t) = \quad (2)$$

$$\int (p^2(t)\cos^2\varphi + p^2(t-\tau)\sin^2\varphi + 2p(t)p(t-\tau)\cos\varphi\sin\varphi\cos\theta)dt =$$

$$\frac{1}{2}\int p^2(t)dt + \frac{1}{2}\int p^2(t-\tau)dt + (-1)^k \cos\theta \int p(t)p(t-\tau)dt$$

The first and second terms of the equation produce signals which are independent of the timing offset τ. The third term is maximized (for k=0) or minimized (for k=1) when the relative phase θ between I and Q is zero and when the signals are time aligned (τ=0).

The calibration process can be executed in two steps:
1. Adjust relative phase between I and Q to maximize the measured signal.
2. Adjust relative timing to get maximum of the measured.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical device, comprising:
   a first Mach-Zehnder modulator that produces a first output;
   a second Mach-Zehnder modulator that produces a second output;
   a splitter coupled to the first and second Mach-Zehnder modulators;
   a combiner that combines the first and second outputs; and
   a phase shifter coupled to at least one of the first and second Mach-Zehnder modulators, wherein
   the splitter splits an incoming light having linear polarization state into two beams having the same polarization state;
   the first Mach-Zehnder modulator, the second Mach-Zehnder modulator, the splitter, the combiner and the phase shifter are formed as part of a singe planar chip made of electro-optical material.

2. The optical device of claim 1, wherein the single planar chip is a single piece of crystal.

3. The optical device of claim 1, wherein the chip is made of a material selected from LiNbO.sub.3 or LiTaO.sub.3.

4. The optical device of claim 1, wherein the chip is made of LiNbO.sub.3 or LiTaO.sub.3 cut at X, or Y, or Z planes.

5. The optical device of claim 1, wherein the splitter is a Y-junction.

6. The optical device of claim 1, wherein the splitter is a waveguide coupler.

7. The optical device of claim 1, wherein the combiner is a Y-junction.

8. The optical device of claim 1, wherein the combiner is a waveguide coupler.

9. The optical device of claim 1, wherein the first Mach-Zehnder modulator includes a first biasing electrode, and the second Mach-Zehnder modulator includes a second biasing electrode.

10. The optical device of claim 1, further comprising: a first bias electrode coupled to the first Mach-Zebnder modulator; and a second bias electrode coupled to the second Mach-Zehnder modulator.

11. The optical device of claim 10, wherein each of the first and second bias electrode is a push-pull configuration.

12. The optical device of claim 10, wherein the first and second bias electrode are configured to optimize a DC bias point of the first and second Mach-Zehnder modulators.

13. The optical device of claim 1, wherein the splitter is adjustable.

14. The optical device of claim 1, wherein the combiner is adjustable.

15. The optical device of claim 1, wherein each of the first and second Mach-Zehnder modulators is a push-pull configuration.

16. The optical device of claim 1, wherein the splitter is positioned at an input of the optical device, and the combiner is positioned at an output of the device.

17. The optical device of claim 1, wherein the splitter and combiner are 3-dB devices.

18. The optical device of claim 1, wherein each of the first and second Mach-Zehnder modulators is driven by an RF signal.

19. The optical device of claim 1, wherein
   the optical device includes at least a first and a second waveguide each associated with one of the first and second Mach-Zehnder modulators.

20. The optical device of claim 1, wherein
   the waveguides of the first and second Mach-Zehnder modulators are coplanar to each other.

21. The optical device of claim 1, further comprising:
   a phase shifter with a third bias electrode coupled to each of the first and second Mach-Zehnder modulators and configured to provide an adjustable 90-degree phase difference between outputs from first and second Mach-Zehnder modulators.

22. The optical device of claim 21, wherein the phase shifter is a push-pull configuration.

23. The optical device of claim 1, wherein the splitter divides an input beam into substantially equal first and second beams that are directed to the first and second Mach-Zehnder modulators.

24. The optical device of claim 1, wherein each of the first and second Mach-Zehnder modulators are independently modulatable.

25. The optical device of claim 1, wherein the electro-optical material is a crystal made of a material selected from LiNbO.sub.3 or LiTaO.sub.3, with a cut at X, Y, or Z planes relatively to an axis of the crystal.

26. The optical device of claim 1, wherein indifussed metal technology is used with the electro-optical material.

27. The optical device of claim 1, wherein protonic-exchange optical technology is used with the electro-optical material.

28. The optical device of claim 1, wherein etching optical technology is used with the electro-optical material.

29. The optical device of claim 1, wherein milling optical technology is used with the electro-optical material.

30. The optical device of claim 1, wherein the electro-optical material includes a substrate coated with a buffer.

31. The optical device of claim 30, wherein the buffer is silicon dioxide.

32. An optical device, comprising:
   a first Mach-Zehnder modulator that produces a first output;

a second Mach-Zehnder modulator that produces a second output;
a third Mach-Zehnder modulator that produces a third output;
a fourth Mach-Zehnder modulator that produces a fourth output;
a first input splitter coupled to the first and second Mach-Zehnder modulators;
a first phase shifter coupled to at least one of the first and second outputs;
a first output combiner positioned to combine the first and second outputs from the first and second Mach-Zehnder modulators;
a second input splitter coupled to the third and fourth Mach-Zehnder modulators;
a second phase shifter coupled to at least one of the third and fourth outputs;
a second output combiner positioned to combine the third and fourth outputs; wherein
the first input splitter splits an incoming light having linear polarization state into two beams having the same polarization state, and
the second input splitter splits an incoming light having linear polarization state into two beams having the same polarization state.

33. The optical device of claim 32, wherein
the first, second, third and fourth Mach-Zehnder modulators, the first and second input splitters, the first and second phase shifters, and the first and second input splitters are formed as part of a chip made of electro-optical material.

34. The optical device of claim 32, further comprising:
a third input splitter coupled to the first and second input splitters.

35. The optical device of claim 34, further comprising: a third combiner coupled to the first and second combiners.

36. The optical device of claim 35, wherein the third splitter and third combiner are formed as a part of the chip.

37. The optical device of claim 36, wherein the third splitter and third combiner are formed as a part of a second chip.

38. The optical device of claim 35, wherein the third combiner is a 3-dB device.

39. The optical device of claim 35, wherein the third combiner is adjustable.

40. The optical device of claim 34, wherein the third input splitter is a 3-dB device.

41. The optical device of claim 34, wherein the third input splitter is a Y-junction.

42. The optical device of claim 34, wherein the third input splitter is a waveguide coupler.

43. The optical device of claim 34, wherein the first output combiner is a waveguide coupler.

44. The optical device of claim 34, wherein the third input splitter is adjustable.

45. The optical device of claim 34, where the third input splitter is polarization splitter.

46. The optical device of claim 32, further comprising: a polarization converter and combiner coupled to the first and second combiners.

47. The optical device of claim 32, wherein the first, second, third and fourth Mach-Zehnder modulators, first and second splitters, first and second combiners are formed as a part of a chip made of an electro-optical material, and the first and second phase shifters, third splitter and third combiner are formed as a part of a second chip made of an electro-optical material.

48. The optical device of claim 32, wherein the first output combiner is a Y-junction.

49. A method of producing an optical output, comprising:
providing an optical device with first and second Mach-Zehnder modulators formed as part of a single planar chip made of electro-optical material;
splitting an incoming light having linear polarization state into two beams having the same polarization state;
producing a first output from the first Mach-Zehnder modulator;
producing a second output from the second Mach-Zehnder modulator; and
combining the first and second outputs to produce a combined output.

50. The method of claim 49, further comprising:
applying a bias voltage to each of the first and second Mach-Zehnder modulator to set a DC bias point.

51. The method of claim 49, further comprising:
maintaining the first and second Mach-Zehnder modulators at extinction points.

52. The method of claim 49, further comprising:
detecting an average optical power of the combined output.

53. The method of claim 52, further comprising:
minimizing the average optical power of the combined output.

54. The method of claim 49, further comprising:
detecting an average optical power of the first and second outputs.

55. The method of claim 54, further comprising:
minimizing the average optical power of each of the first and second outputs.

56. The method of claim 49, further comprising:
applying a signal to each of the first and second Mach-Zehnder modulators in response to an avenge power of the combined output.

57. The method of claim 49, further comprising:
applying a signal to each of the first and second Mach-Zehnder modulators in response to an average power of the first output and the second output respectively.

58. The method of claim 49, further comprising:
obtaining a 90-degree phase difference between the first and second Mach-Zehnder modulators.

59. The method of claim 49, further comprising:
detecting an optical power variation of the combined output.

60. The method of claim 59, further comprising:
minimizing the optical power variation of the combined output.

61. The method of claim 49, further comprising:
producing a signal in respond to a data-induced optical power variation of the combined output.

62. The method of claim 49, further comprising:
maintaining the same output power at each of a channel of the first and second Mach-Zehnder modulators.

63. The method of claim 62 further comprising:
equalizing the output power of each channel of the first and second Mach-Zehnder modulators separately.

64. The method of claim 63, further comprising:
amplitude modulating at least one of the channels; and detecting a power of at modulating frequency.

65. The method of claim 49, further comprising:
obtaining a timing alignment between applied data signals and optical pulses.

66. The method of claim 49, further comprising:
detecting an average output power from at least one of the first or second Mach-Zehnder modulators; and producing a signal proportional to an average output power for the average output power related to a timing alignment between applied data signals or an optical pulse and an applied data signal.

67. The method of claim 49, wherein the optical device includes a feedback control loop that produces a signal to maximize a voltage timing signal.

68. The method of claim 49, wherein each of the first and second Mach-Zehnder modulators is driven by an RF signal.

69. A method for dual polarization transmission, comprising:
- a polarization splitting of light having arbitrary polarization state into a first polarization beam and a second polarization beam each having linear polarization state, wherein polarization states of these beams are orthogonal to each other;
- splitting the first polarization beam into two beams having the same polarization state;
- splitting the second polarization beam into two beams having the same polarization state;
- providing a device that includes a first optical device with first and second Mach-Zehnder modulators, and
- a second optical device with third and fourth Mach-Zehnder modulators,
- the first and second optical devices being formed as part of a single planar chip made of electro-optical material;
- producing from the first optical device of a first output with a first polarization;
- producing from the second optical device a second output with a second polarization;
- combining the first and second outputs to produce a beam with two orthogonal polarization signals.

* * * * *